United States Patent
Cochran et al.

(10) Patent No.: US 10,150,830 B2
(45) Date of Patent: Dec. 11, 2018

(54) METHYL METHACRYLATE VINYLAROMATE COPOLYMERS

(71) Applicant: INEOS STYROLUTION GROUP GMBH, Frankfurt (DE)

(72) Inventors: Thomas W. Cochran, Channahon, IL (US); Norbert Niessner, Friedelsheim (DE)

(73) Assignee: INEOS STYROLUTION GROUP GMBH (DE)

( * ) Notice: Subject to any disclaimer, the term of this patent is extended or adjusted under 35 U.S.C. 154(b) by 0 days.

(21) Appl. No.: 15/117,364

(22) PCT Filed: Feb. 9, 2015

(86) PCT No.: PCT/EP2015/052606
§ 371 (c)(1),
(2) Date: Aug. 8, 2016

(87) PCT Pub. No.: WO2015/118142
PCT Pub. Date: Aug. 13, 2015

(65) Prior Publication Data
US 2016/0355625 A1    Dec. 8, 2016

(30) Foreign Application Priority Data

Feb. 10, 2014   (EP) .................................... 14154424

(51) Int. Cl.
| | | |
|---|---|---|
| *C08F 220/14* | (2006.01) | |
| *C08F 212/08* | (2006.01) | |
| *C08L 25/06* | (2006.01) | |
| *C08L 33/12* | (2006.01) | |
| *C09D 125/14* | (2006.01) | |

(52) U.S. Cl.
CPC .......... *C08F 220/14* (2013.01); *C08F 212/08* (2013.01); *C08L 25/06* (2013.01); *C08L 33/12* (2013.01); *C09D 125/14* (2013.01); *C08L 2201/10* (2013.01)

(58) Field of Classification Search
CPC ...... C08F 212/08; C08F 220/14; C08L 25/06; C08L 33/12; C08L 2201/10; C09D 125/14

See application file for complete search history.

(56) References Cited

U.S. PATENT DOCUMENTS

| | | | | |
|---|---|---|---|---|
| 5,408,003 A | * | 4/1995 | Honda et al. ......... | C08F 257/02 525/226 |
| 5,980,790 A | * | 11/1999 | Kuwahara et al. ... | C08F 220/14 264/101 |
| 2009/0244708 A1 | | 10/2009 | Kameshima et al. | |
| 2013/0183537 A1 | | 7/2013 | Sato et al. | |
| 2016/0289438 A1 | * | 10/2016 | Cochran ................. | C08L 25/14 |

FOREIGN PATENT DOCUMENTS

| | | | | |
|---|---|---|---|---|
| DE | 3730886 A1 | 3/1989 | | |
| GB | 464688 A | 4/1937 | | |
| GB | 531956 A | 1/1941 | | |
| GB | 863279 | * 3/1961 | ............... | C08D 1/00 |
| GB | 863279 A | 3/1961 | | |
| WO | 03/051973 A1 | 6/2003 | | |

OTHER PUBLICATIONS

Wang et al., "Copolymerization of styrene and methyl methacrylate mediated by iron wire/N,N,N1,N1-tetramethyl-1,2-ethanediamine as catalyst in the presence of air," Iran Polym. J., 2013, 22, pp. 109-116.

Yu et al., "Compatibility of tetramethyl polycarbonate and random poly(styrene-co-methyl methacrylate)s," Makromol. Chem., 1991 192, pp. 2749-2766.

\* cited by examiner

*Primary Examiner* — Nathan M Nutter
(74) *Attorney, Agent, or Firm* — J.A. Lindeman & Co., PLLC

(57) ABSTRACT

A copolymer comprising (A) 20-50% (w/w) of methyl methacrylate (MMA), (B) 40-80% (w/w) of one or more vinylaromatic(s) and, optionally, (C) 0-10% (w/w) of one or more aliphatic vinyl(s) can be used in a polymer composition for generating translucent final products.

18 Claims, No Drawings

METHYL METHACRYLATE VINYLAROMATE COPOLYMERS

The present invention relates to methyl methacrylate vinyl-aromatic copolymers and their preparation. The invention in particular proposes a specific type of copolymer, which comprises (A) 20-50% (w/w) of methyl methacrylate (MMA), (B) 40-80% (w/w) of one or more vinylaromatic(s) and, optionally, (C) 0-10% (w/w) of one or more aliphatic vinyl(s). Moreover, one object of the present invention is a polymer blend comprising the copolymer according to the present invention and a further thermoplastic component. The invention also deals with a product comprising such polymer blend or the copolymer according to the present invention. The present invention further relates to the use of a copolymer, a polymer blend or a product according to the present invention for generating translucent final product or parts thereof. Furthermore, the present invention relates to a method for producing the copolymer according to the present invention.

Translucent and partly translucent polymer materials are of considerable importance for many technical applications. Exemplarily, it is desirable to obtain translucent packing materials (e.g. translucent films (e.g. for food packing) or plastics moldings (e.g. bottles, boxes, etc.)), translucent parts of buildings (e.g., window panes, films, signboards etc.), translucent parts of cars (e.g. panes, lamb cases, keys, screens etc.), translucent parts of electronics (e.g. screen surfaces, cases, lambs, keys, etc.), optical fibers or translucent parts of varnish, toys, sports equipment or medical and laboratory equipment). Particularly desirable are such polymers which are translucent in the range of visible light as well as nearer ultraviolet (UV) light, i.e., in a wavelength range of from approximately 250 nm to approximately 800 nm.

Poly-methyl methacrylate polymer (PMMA) bears such translucent properties. In particular, PMMA is well-translucent in the range from visible light and nearer UV light, i.e., in a wavelength range of from 250 nm to 800 nm.

However, the technical applicability of PMMA is severely hampered and limited by its low ceiling temperature of approximately 220° C., meaning that PMMA is thermodynamically instable around and above that temperature and is slightly disturbed upon even moderate heating. As typically the molding process is conducted in the range of 200° C. to 280° C. or higher, the PMMA is poorly usable in such process that includes standard molding of the polymer mass.

In contrast to PMMA, vinylaromatic polymers such as, e.g., polystyrene or polymers based on derivatives of styrene bear desirable properties regarding processability and stability during the molding process. Polystyrene (PS), for instance, has a ceiling temperature of 310° C., hence is thermodynamically much more stable than PMMA. Both, PMMA and polyvinylaromatics (such as PS) are, as homopolymers, used for optical purposes, for example for LED light scattering panels, where a matrix of polystyrene is used, with dispersed light diffraction particles inside.

In the prior art copolymers comprising methyl methacrylate (MMA) and vinylaromatics are described in general terms. In GB 464688 of 1937 copolymers comprising MMA and styrene were generally described. In GB 531956 of 1941 partly translucent copolymers comprising MMA were obtained. In GB 863279 of 1961 a thermoplastic composition, comprising a copolymer of styrene with MMA mixed intimately with and bound to a synthetic rubber was described and taught to be partly transparent for light in the visible range at 400 nm and 500 nm, respectively. Later, iso-refractive copolymers comprising MMA and impact modified styrene (styrene/butadiene block copolymers) were described in WO 2003/051973, wherein it was taught that styrene moieties should be used in wide excess.

The vinylaromatic moieties, however, absorb light in the range of the nearer UV light, in particular in the range of from 250 nm to 370 nm. Therefore, in the copolymers comprising typically used amounts of vinylaromatic moieties bear severely impaired translucency properties. For many technical applications, good translucency of light in the nearer UV spectrum is required such as, exemplarily, for plant growth, solar cells or laboratory measuring devices. Also the visual appearance of a commercial product, such as a food or consumer product, a beverage or cloths may be severely impaired when UV light cannot pass its packing material because visible brightening fluorescence effects in the blue spectrum of the visible light (e.g., resulting from brightener agents) are severely suppressed.

In view of the above, there is an unmet technical need to obtain copolymers based on MMA which are highly translucent and still suitable for molding processes conducted at higher temperatures.

Surprisingly, it has been found that copolymers comprising MMA and one or more vinylaromatic(s), in particular styrene, wherein the MMA content in the copolymer is in the narrow range of between 20 and 50% (w/w), in particular in the range of 40-50% (w/w), bear such desired properties.

Such copolymers are concomitantly highly translucent and still well-suitable for molding processes conducted at higher temperatures. This beneficial combination of properties opens new fields of technical applicability of MMA blends.

In one first aspect, the present invention relates to a copolymer comprising (or consisting of) the following monomers:

(A) 20-50% (w/w) of methyl methacrylate (MMA);
(B) 40-80% (w/w) of one or more vinylaromatic(s); and optionally
(C) 0-10% (w/w) of one or more aliphatic vinyl(s).

Preferably, throughout the present invention, the given portions, indicted as "% (w/w)" (i.e., % weight per weight) of components (A), (B) and (C) sum up to 100% (w/w). Preferably, the copolymer consists of the following monomers:

(A) 20-50% (w/w) of methyl methacrylate (MMA),
(B) 40-80% (w/w) of one or more vinylaromatic(s), and optionally
(C) 0-10% (w/w) of one or more aliphatic vinyl(s).

In a preferred embodiment, the MMA and vinylaromatic(s) are not bound to rubber monomers such as butadiene moieties. In particular the vinylaromatic is styrene.

The term "copolymer" as used herein may be understood in the broadest sense as any polymer comprising two or more different types of monomers (i.e., at least (A) MMA and (B) at least one vinylaromatic) covalently conjugated with another. The terms indicating that the copolymer comprises monomers or the polymer consist of monomers will be understood by those skilled in the art as meaning that the monomers in this context are monomeric moieties embedded into the copolymer strand.

Typically, the copolymer according to the present invention will comprise at least 100, preferably at least 500, more preferably at least 1000, often at least 5000 consecutive monomer moieties according to the present invention.

Preferably, the melt flow index (MFI) (determined at a temperature of 200° C. and at a load of 5 kg according to ASTM procedure D1238) of the copolymers according to the present invention is less than 50 g/10 min, more preferably less than 20 g/10 min, even more preferably of less than 10 g/10 min, often less than 5 g/10 min. Preferably, the ASTM procedure D1238 is used in the version of the year 2013.

In a copolymer, the different types of monomer moieties may be either evenly and homogeneously distributed over the copolymer (random copolymer) or may be located at a defined area of the polymer strand(s), i.e. in a block (block copolymer). As used herein, the term "block copolymer" may be understood in the broadest sense as any copolymer having a defined polymer structure. Preferably, the copolymer is a random copolymer.

Optionally, the copolymer according to the present invention may also contain one or more cross-linking moiety/moieties such as, e.g., divinylbenzene, in its polymer strand. Preferably, such cross-linking agents do constitute for not more than 25% (w/w) of the copolymer mass, more preferably not more than 10% (w/w) of the copolymer mass, often not more than 5% (w/w) of the copolymer mass.

The copolymer according to the present invention may bear a linear, circular or branched structure. A circular structure is a copolymer strand wherein both ends are conjugated with another. As used herein, the term "branched structure" may be understood in the broadest sense any structure deviating from a plain linear or circular structure. Accordingly, in a polymer of branched structure, there is at least one monomer binding to three or more other monomer(s). Preferably, the copolymer of the present invention is an essentially linear or circular copolymer, more preferably an essentially linear copolymer, in particular a linear random copolymer.

The copolymer according to the present invention may optionally be associated with amounts of not more than 5% (w/w) of compounds not included in the copolymer strand, thus, not covalently bound thereto or therein but rather associated therewith by means of physical interactions such as, e.g., ion interactions, hydrogen bonds, pi-pi-electron interactions and/or aliphatic interactions (Van-der-Waals interactions). Such associated other compounds may exemplarily be metals, cations, anions, fatty acids, weakeners, residuals of solvents etc. Preferably, the copolymer is not associated with more than 5% (w/w) of such compounds not covalently bound to the copolymer strand, more preferably not more than 2% (w/w), even more preferably not more than 1% (w/w), in particular not more than 0.5% (w/w). These compounds not covalently bound to the copolymer strand may be removed during processing of the copolymer (e.g. be means of one or more washing steps(s), one or more precipitation steps(s), by means of thermal degradation and/or by means of blending the copolymer) or may remain associated to the copolymer as one or more additive(s).

Preferably, the copolymer according to the present invention is translucent or at least partly translucent. In particular, when the polymer is once heated above the glass transition temperature Tg, subsequently molded and finally cooled below the glass transition temperature Tg, the obtained copolymer molding may be translucent or at least partly translucent. The Tg-value of the copolymer can be determined by classical methods. Preferably the obtained copolymer molding is translucent when the obtained plastics molding is more than 0.5 mm, preferably more than 1 mm, more preferably more than 2 mm, often from 3.2 mm to 10 mm thick. The light transmittance (250-370 nm), at a layer thickness of 3.2 mm preferably is higher than 80%, often higher than 85%.

As used throughout the present invention, the term "translucent" may be understood in the broadest sense as ability of letting light pass through. Herein, the terms "translucent", "translucid", "transparent", "light-transmissive" and "diaphanous" may be understood interchangeably. Preferably, translucency means, that, at a thickness of a sample of ⅛ inch (approximately 3.2 mm), at least 50%, preferably of at least 60%, more preferably of at least 70%, even more preferably of at least 80%, in particular of at least 85% of ultraviolet (UV) light at a wavelength range of between 250 nm and 370 nm passes through. Particularly preferably, translucency means that, in a sample of 0.5 mm, 1 mm, 3.2 mm, 5 mm or even 1 cm, at least 50%, preferably of at least 60%, more preferably of at least 70%, even more preferably of at least 80%, in particular of at least 85% of ultraviolet (UV) and visible light at a wavelength range of from 250 nm to 800 nm passes through.

As used herein, a methyl methacrylate (MMA) (B) may be understood in the broadest sense. Herein, the terms "methyl methacrylate", "methyl methacrylate moiety", "methyl methacrylate monomer", "methyl methacrylate monomer moiety" and similar terms may be understood interchangeably.

As used herein, a vinylaromatic (B) may be understood in the broadest sense as any as any moiety bearing at least one vinyl residue ($-CH=CH_2$) in its monomeric form and at least one monocyclic or polycyclic aromatic residue known in the art. The person skilled in the art will notice that upon polymerization, the double bond of the vinyl residue is cleaved and is, thereby, embedded into the polymeric strand. In accordance with international commonly designation standards, the monomeric moiety as well as the moiety embedded into the polymeric strand is designated as vinylaromatic.

Herein, the terms "vinylaromatic", "vinylaromatic moiety", "vinylaromatic monomer", "vinylaromatic monomer moiety", "aromatic vinyl", "aromatic vinyl moiety", "aromatic vinyl monomer", "aromatic vinyl monomer moiety" and similar terms may be understood interchangeably. Preferably, the vinylaromatic monomer bears one vinyl residue ($-CH=CH_2$) and one monocyclic or polycyclic aromatic residue. More preferably, the vinylaromatic monomer bears one vinyl residue ($-CH=CH_2$) and one monocyclic aromatic residue, such as styrene. Preferably, the vinylaromatic monomer has a molecular weight (Mw) of not more than 500 Da, preferably not more than 250 Da, more preferably not more than 200 Da, in particular not more than 150 Da.

As throughout the invention, the term "molecular weight" or "Mw" may be understood in the broadest sense as the mass of a molecule or a section of a molecule (e.g., a moiety or a (co)polymer strand) provided in g/mol (Da) and kg/mol (kDa), respectively. Preferably, the molecular weight (Mw) may be the average weight in the population of molecules observed, i.e., the overall average of the molecular weight (Mw) of the molecules characterized by a certain Mw. The Mw may be measured by any methods known to those skilled in the art (e.g., by mass spectrometry or size exclusion chromatography).

In a preferred embodiment, the one or more vinylaromatic(s) (B) comprise(s) styrene and/or one or more styrene derivative(s). As used herein, a styrene derivative may be any derivative of styrene known in the art such as, e.g. alkylated styrene (e.g., alpha-methylstyrene, alpha-ethylstyrene, 2-methylstyrene, 3-methylstyrene, 4-methylstyrene, 2-ethylstyrene, 3-ethylstyrene, 4-ethylstyrene, 2,3-dimethylstyrene, 2,4-dimethylstyrene, 2,5-dimethylstyrene, 2,6-dimethylstyrene, 2,3-diethylstyrene, 2,4-diethylstyrene, 2,5-diethylstyrene, 2,6-diethylstyrene, 2-methyl-3-ethylstyrene, 2-methyl-4-ethylstyrene, 2-methyl-5-ethylstyrene, 2-methyl-6-ethylstyrene, 3-methyl-2-ethylstyrene, 3-methyl-4-ethylstyrene, 3-methyl-5-ethylstyrene, 3-methyl-6-ethylstyrene, 4-methyl-5-ethylstyrene, 4-methyl-6-ethylstyrene, 2-ethyl-3-methylstyrene, 2-ethyl-4-methylstyrene, 2-ethyl-5-methylstyrene, 2-ethyl-6-methylstyrene, 3-ethyl-4-methylstyrene, 3-ethyl-5-methylstyrene, 3-methyl-6-ethylstyrene, 4-ethyl-5-methylstyrene, 4-ethyl-6-methylstyrene), halogenated styrene (e.g., e.g., 2-chloro-styrene, 3-chloro-styrene, 4-chloro-styrene, 2-fluoro-styrene, 3-fluoro-styrene, 4-fluoro-styrene, 2,3-di-chloro-styrene, 2,4-di-chloro-styrene, 2,5-di-chloro-styrene, 2,6-di-chloro-styrene, 2,3-di-fluoro-styrene, 2,4-di-fluoro-styrene, 2,5-di-fluoro-styrene, 2,6-di-fluoro-styrene, 2-chloro-3-fluoro-styrene, 2-chloro-4-fluoro-styrene, 2-chloro-5-fluoro-styrene, 2-chloro-6-fluoro-styrene, 3-chloro-2-fluoro-styrene, 3-chloro-4-fluoro-styrene, 3-chloro-5-fluoro-styrene, 3-chloro-6-fluoro-styrene, 4-chloro-5-fluoro-styrene, 4-chloro-6-fluoro-styrene, 2-fluoro-3-chloro-styrene, 2-fluoro-4-chloro-styrene, 2-fluoro-5-chloro-styrene, 2-fluoro-6-chloro-styrene, 3-fluoro-4-chloro-styrene, 3-fluoro-5-chloro-styrene, 3-chloro-6-fluoro-styrene, 4-fluoro-5-chloro-styrene, 4-fluoro-6-chloro-styrene) or hydroxystyrene styrene (e.g., 2-hydroxystyrene, 3-hydroxystyrene, 4-hydroxystyrene, 2,3-dihydroxystyrene, 2,4-dihydroxystyrene, 2,5-dihydroxystyrene, 2,6-dihydroxystyrene).

Particularly preferably, the styrene derivative according to the present invention is alpha-methylstyrene or styrene. In a preferred embodiment, the one or more vinylaromatic(s) (b) comprise(s) styrene. In an even more preferred embodiment, the one or more vinylaromatic(s) (B) comprise(s) at least 50% (w/w) styrene, preferably at least 70% (w/w) styrene, more preferably at least 80% (w/w) styrene, even more preferably at least 90% (w/w) styrene, in particular wherein the only vinylaromatic (B) in said copolymer is styrene. In a particularly preferred embodiment, the only vinylaromatic (B) in said copolymer is styrene.

The copolymer according to the present invention comprises (A) MMA, (B) styrene and, optionally (C) one or more aliphatic vinyl(s). More preferably, the copolymer according to the present invention consists of (A) MMA, (B) styrene and, optionally (C) one or more aliphatic vinyl(s). Particularly preferably, the copolymer according to the present invention consists of (A) MMA and (B) styrene.

As noted above, the copolymer according to the present invention may optionally further comprise (C) one or more aliphatic vinyl(s). The aliphatic vinyl (C) may be understood in the broadest sense as any aliphatic (i.e., non-aromatic) monomer moiety bearing vinyl residue (—CH=CH$_2$). The person skilled in the art will notice that upon polymerization, the double bond of the vinyl residue is cleaved and is, thereby, embedded into the polymeric strand. In accordance with international commonly designation standards, the monomeric moiety as well as the moiety embedded into the polymeric strand is designated as aliphatic vinyl. As used herein, the terms "aliphatic vinyl", "vinylaliphatic", "aliphatic vinyl moiety", "aliphatic vinyl monomer", "aliphatic vinyl monomer moiety", "vinylaliphatic moiety", "vinylaliphatic monomer", "vinylaliphatic monomer moiety", and similar terms may be understood interchangeably. Preferably, an aliphatic vinyl in the context of the present invention has a molecular weight of not more than 500 Da, in particular not more than 250 Da. Exemplarily, an aliphatic vinyl may be acrylonitrile, butadiene, N-maleimide, vinyl halogen (e.g., vinyl chloride, vinyl fluoride), vinyl acetate, an (meth)acryl other than methyl methacrylate, ethylene, propylene, vinyl alcohol (e.g., ethenol, 2-propenol). Also mixtures of two or more of the aforementioned may be used in the copolymer according to the present invention.

As noted above, the copolymer according to the present invention may be a random polymer or a block polymer. In a preferred embodiment, the copolymer is a random copolymer. As used herein, a random polymer is a copolymer wherein the different types of monomer moieties (i.e., at least (A), (B) and optionally (C)) are essentially evenly and homogeneously distributed over the copolymer.

As indicated above, the optimal balance between translucency on the one hand and processibility on the other hand is only achieved in copolymers having a methyl methacrylate (MMA) content in a rather narrow range of 20-50% (w/w), in particular 40-50% (w/w).

An MMA content beyond those range leads to either poor transparency (MMA content of less than 20% (w/w)) or poor processibility (MMA content of above 50% (w/w)).

An optimal balance between transparency and processibility is particularly achieved in copolymers having an MMA content in a range of 20-50% (w/w), more preferably in a range of 30-45% (w/w) or 40-50% (w/w), in particular in the in a range of 40-45% (w/w) or 45-50% (w/w).

Depending on which property (translucency or processibility) is even more important for an individual technical application, the MMA content may be adapted accordingly within the range of from 20 to 50% (w/w) MMA content.

For those applications were the translucency plays a particularly important role, the MMA content is more preferably in the range of 25-50% (w/w), even more preferably in the range of 30-50% (w/w), even more preferably in the range of 35-50% (w/w), even more preferably in the range of 45-50% (w/w), in particular in the range of 45-50% (w/w). For those applications were the translucency plays a less important role, the MMA content is more preferably in the range of 20-45% (w/w), even more preferably in the range of 20-40% (w/w), even more preferably in the range of 20-35% (w/w), even more preferably in the range of 20-30% (w/w), in particular in the range of 20-25% (w/w).

Preferably, the copolymer according to the present invention comprises less than 10% (w/w) of one or more aliphatic vinyl(s) (C), more preferably less than 9% (w/w) aliphatic vinyl(s), even more preferably less than 8% (w/w) aliphatic vinyl(s), even more preferably less than 7% (w/w) aliphatic vinyl(s), even more preferably less than 6% (w/w) aliphatic vinyl(s), even more preferably less than 5% (w/w) aliphatic vinyl(s), even more preferably less than 4% (w/w) aliphatic vinyl(s), even more preferably less than 3% (w/w) aliphatic vinyl(s), even more preferably less than 2% (w/w) aliphatic vinyl(s), even more preferably less than 1% (w/w) aliphatic vinyl(s), in particular essentially no aliphatic vinyl(s). When the copolymer is such consisting of MMA and one or more vinylaromatic(s), this means that the content of the other two components may be increased accordingly wherein the content of MMA may not go beyond the range of 20-50% (w/w).

Therefore, preferably, the copolymer comprises (or consists of):
(A) 20-50% (w/w) of methyl methacrylate (MMA);
(B) 50-80% (w/w) of one or more vinylaromatic(s); and
optionally
(C) 0-5% (w/w) of one or more aliphatic vinyl(s),
in particular wherein the sum of (A), (B) and (C) constitutes for 100% (w/w).

More preferably, the copolymer comprises (or consists of):
(A) 30-50% (w/w) of methyl methacrylate (MMA);
(B) 50-70% (w/w) of one or more vinylaromatic(s); and optionally
(C) 0-5% (w/w) of one or more aliphatic vinyl(s),
in particular wherein the sum of (A), (B) and (C) constitutes for 100% (w/w).

Often, the copolymer comprises (or consists of):
(A) 30-45% (w/w) of methyl methacrylate (MMA);
(B) 55-70% (w/w) of one or more vinylaromatic(s); and optionally
(C) 0-1% (w/w) of one or more aliphatic vinyl(s),
in particular wherein the sum of (A), (B) and (C) constitutes for 100% (w/w).

Often, the copolymer of the invention consists of:
(A) 35-45% (w/w) of methyl methacrylate (MMA);
(B) 55-65% (w/w) of one or more vinylaromatic(s); and optionally
(C) 0-1% (w/w) of one or more aliphatic vinyl(s),
in particular wherein the sum of (A), (B) and (C) constitutes for 100% (w/w).

Highly preferably, the copolymer comprises (or consists of):
(A) 40-45% (w/w) of methyl methacrylate (MMA);
(B) 55-60% (w/w) of one or more vinylaromatic(s); and optionally
(C) 0-1% (w/w) of one or more aliphatic vinyl(s),
in particular wherein the sum of (A), (B) and (C) constitutes for 100% (w/w).

Highly preferably, the copolymer comprises (or consists of):
(A) 45-50% (w/w) of methyl methacrylate (MMA);
(B) 50-55% (w/w) of one or more vinylaromatic(s); and optionally
(C) 0-1% (w/w) of one or more aliphatic vinyl(s),
in particular wherein the sum of (A), (B) and (C) constitutes for 100% (w/w).

Herein, the one or more vinylaromatic(s may preferably be defined as above, more preferably comprise at least 50% (w/w) styrene, even more preferably comprise at least 90% (w/w) styrene, in particular the only vinylaromatic comprised in the copolymer is styrene. Accordingly, highly preferably, the copolymer then comprises (A) 20-50% (w/w) of methyl methacrylate (MMA) and (B) 50-80% (w/w) styrene.

When the copolymer comprises essentially no aliphatic vinyl(s), it comprises (A) 20-50% (w/w) of methyl methacrylate (MMA) and (B) 50-80% (w/w) of one or more vinylaromatic(s). Highly preferably, the copolymer does not comprise any further polymer moieties than MMA and one or more vinylaromatic(s).

Therefore, in a preferred embodiment, the copolymer consists of:
(A) 20-50% (w/w) of methyl methacrylate (MMA); and
(B) 50-80% (w/w) of one or more vinylaromatic(s).

More preferably, the copolymer consists of:
(A) 25-50% (w/w) of methyl methacrylate (MMA); and
(B) 50-75% (w/w) of one or more vinylaromatic(s).

Even more preferably, the copolymer consists of:
(A) 30-50% (w/w) of methyl methacrylate (MMA); and
(B) 50-70% (w/w) of one or more vinylaromatic(s).

Even more preferably, the copolymer consists of:
(A) 35-50% (w/w) of methyl methacrylate (MMA); and
(B) 50-65% (w/w) of one or more vinylaromatic(s).

In an even preferred embodiment, the copolymer consists of:
(A) 40-50% (w/w) of methyl methacrylate (MMA); and
(B) 50-60% (w/w) of one or more vinylaromatic(s).

Particularly preferably, the copolymer consists of:
(A) 45-50% (w/w) of methyl methacrylate (MMA); and
(B) 50-55% (w/w) of one or more vinylaromatic(s).

Also particularly preferably, the copolymer consists of:
(A) 35-45% (w/w) of methyl methacrylate (MMA); and
(B) 55-65% (w/w) of one or more vinylaromatic(s).

Also particularly preferably, the copolymer consists of:
(A) 30-45% (w/w) of methyl methacrylate (MMA); and
(B) 55-70% (w/w) of one or more vinylaromatic(s).

Also particularly preferably, the copolymer consists of:
(A) 40-45% (w/w) of methyl methacrylate (MMA); and
(B) 55-60% (w/w) of one or more vinylaromatic(s).

In these aforementioned preferred copolymers, the one or more vinylaromatic(s) may preferably be defined as above, more preferably comprise at least 50% (w/w) styrene, even more preferably comprise at least 90% (w/w) styrene, in particular the only vinylaromatic comprised in the copolymer is styrene. Further, the copolymer is preferably a random polymer, in particular a linear random polymer.

Such copolymers are suitable translucent even at a wavelength range of 250-370 nm and are still processible in a molding process including heating above 250° C.

Accordingly, in highly preferred embodiment, the copolymer according to the present invention is a random copolymer consisting of:
(A) 40-50% (w/w) of methyl methacrylate (MMA); and
(B) 50-60% (w/w) styrene.

Particularly preferably, the copolymer according to the present invention is a linear random copolymer, consisting of:
(A) 45-50% (w/w) of methyl methacrylate (MMA); and
(B) 50-55% (w/w) styrene.

Alternatively particularly preferably, the copolymer according to the present invention is a linear random copolymer consisting of:
(A) 35-45% (w/w) of methyl methacrylate (MMA); and
(B) 55-65% (w/w) styrene.

Alternatively particularly preferably, the copolymer according to the present invention is a linear random copolymer consisting of:
(A) 30-45% (w/w) of methyl methacrylate (MMA); and
(B) 55-70% (w/w) styrene.

Alternatively particularly preferably, the copolymer according to the present invention is a linear random copolymer consisting of:
(A) 40-45% (w/w) of methyl methacrylate (MMA); and
(B) 55-60% (w/w) styrene.

Such copolymers are highly translucent even at a wavelength range of from 250 to 370 nm and are still suitably processible in a molding process including heating above 250° C.

The copolymer according to the present invention may be used by its own, i.e., without any further components, as a molding mass and may be processed to products such as, e.g. plastics moldings and/or film materials. Optionally, additives may be added to the molding mass comprising the copolymer according to the present invention.

The person skilled in the art will know numerous of such additives commonly and routinously added to molding masses. An additive may be a polymer in the broadest sense or may be a non-polymer-like additive. Preferably, the additive, as used herein, is not a polymer. Preferably, an additive has either a wax/talcum-like appearance at normal conditions (20° C., 1013 mbar, no addition of solvents) and/or a molecular weight of not more than 5 kDa, in particular not more than 1 KDa. An additive as used in the context of the present invention may be any additive known for plastics in the art.

Exemplarily, an additive may be a stabilizer (e.g. a light stabilizer (e.g., an UV-absorber), a process stabilizer, or a radical scavenger, a phenolic primary stabilizer), a glossing agent, an antioxidant, a metal deactivator, an antistatic agent, a flow agent, an anti-sticking agent, metal ions, fatty acids, a pigment (e.g. carbon black), a strengthener, a filling agent (kaolin, chalk, astonite, talcum, calcium carbonate, one or more silicate(s), titan dioxide, zinc oxide, graphite, grapheme, glass particle(s), carbon nanotubes, aluminum oxide, and/or a flame retardant. The type and amount of additive should be chosen in a way that the improved properties of the copolymer composition are kept.

Furthermore, upon processing the copolymer, in particular heating the copolymer above its glass transition temperature $T_g$, one or more types of impurities may potentially occur such as, e.g., as residual(s) from solvent(s), monomer(s), activator(s), precipitation and/or purification step(s), degradation products from monomer(s), activator(s) and/or other pyrolytic product(s).

Accordingly, a molding mass of the copolymer alone may also potentially comprise one or more additive(s) and one or more types of impurities. Preferably, the copolymer molding mass does not comprise more than 10% (w/w) additives and impurities in total, more preferably not more than 5% (w/w) additives and impurities in total. Often, the copolymer composition comprises 0.1 to 5% (w/w) of additives.

The copolymer according to the present invention may optionally also be blended with any types of other (co)polymers blendable therewith to form a polymer blend or copolymer composition. Therefore, in a second aspect, the present invention relates to a polymer composition comprising the copolymer according to the present invention and at least one further thermoplastic polymer component. As used herein, the at least one further thermoplastic polymer component may be any (co)polymer blendable with the copolymer according to the present invention.

In a preferred embodiment, such composition does not comprise rubber, in particular not a polybutadiene rubber.

As used herein, the term "blendable" may be understood in the broadest sense as any possibility to mix one or more copolymer(s) according to the present invention with at least one further thermoplastic polymer component in a way that a comparably homogeneous molding mass is obtained. Therefore, the (co)polymers comprised in the polymer blend may be miscible with another by their own upon heating these above their glass transition temperature $T_g$ or may be only miscible with another by means of admixing a compatibilizing agent such as, e.g., a suitable emulsifier.

Preferably, the (co)polymers comprised in the polymer blend may be miscible with another by their own upon heating these above their glass transition temperature $T_g$.

As used herein, the term "polymer blend" or "polymer composition" may be understood in the broadest sense as any mixture of two or more (co)polymers and optionally additive(s), i.e., comprising at least (i) the copolymer according to the present invention and /ii) a further thermoplastic polymer component. Typically, the polymer blend will bear different physical and/or chemical characteristics in comparison to the unblended (co)polymers independent from another.

Preferably, a polymer blend in the context of the present invention may be a blend of miscible (co)polymers, i.e., a polymer blend bearing a single-phase structure and, preferably, maintains such when processed (e.g., heated above the glass transition temperature $T_g$, in particular heated above 250° C.). Such polymer blend may also be designated as essentially homogenous polymer blend.

Homogenous means that the components of the blend are essentially evenly distributed throughout the polymer blend and there are no macroscopically separated phases, i.e., no structures of phase separations larger than 0.1 mm, preferably no structures larger than 0.05 mm, observable. The optical and haptic appearance of a polymer blend according to the present invention may, preferably, be smooth and uniform. Preferably, the polymer blend may be at least translucent, in particular translucent in the wavelength range of 250-370 nm, in particular in the wavelength range of 250-800 nm. Alternatively, the blend may also be non-transparent/opaque. Preferably, a layer of not more than 3.2 mm, more preferably not more than 0.5 cm, even more preferably not more than 1 cm thickness of the polymer blend is at least partly translucent.

The glass transition temperature $T_g$ of the copolymer blend (or copolymer composition) is preferably in the range of 100° C. to 300° C.

Preferably, the melt flow index (MFI) (determined at a temperature of 200° C. and at a load of 5 kg according to ASTM procedure D1238) of a polymer blend according to the present invention may be less than 50 g/10 min, more preferably of less than 20 g/10 min, even more preferably of less than 10 g/10 min.

Preferably, the polymer blend according to the present invention comprises at least 10% (w/w) of at least one copolymer according to the present invention, in particular at least 25% (w/w), at least 50% (w/w), at least 75% (w/w) or at least 80% (w/w) of at least one copolymer according to the present invention.

Preferably, the polymer blend (or composition) is translucent or at least partly translucent.

The polymer composition may optionally also contain one or more additive(s) and/or an impurity as defined above. Preferably, the polymer blend does not comprise more than 10% (w/w) additives and impurities in total, more preferably not more than 5% (w/w) additives and impurities in total.

As indicated above, the one or more thermoplastic polymer(s) may be any thermoplastic polymer(s) known in the art which are blendable with the copolymer according to the present invention. In a preferred embodiment, the polymer composition comprises, next to at least one copolymer according to the present invention, one or more thermoplastic polymer(s) selected from the group consisting of polystyrene, poly(meth)acrylate, polycarbonate, styrene acrylonitrile copolymer (SAN), acrylonitrile butadiene styrene copolymer (ABS), acrylonitrile styrene acrylate copolymer (ASA), polylactic acid (PLA), polyester, polyoxymethylene, polyethylene, polypropylene, polyvinylchloride (PVC) and polyamide.

As indicated above, the copolymer according to the present invention and/or the polymer blend according to the present invention may be used to produce a product therefrom. Accordingly, a third aspect of the present invention relates to a product comprising a copolymer or a polymer blend according to the present invention. Often the product comprises at least 50% (w/w) of a copolymer or a polymer blend according to the present invention.

In this context, the person skilled in the art will know several means for producing one or more of such products from such molding masses. Producing a product may exemplarily be performed by extrusion, injection molding, casting, blow molding, spraying, spinning, rolling, weaving, forming a suspension from an emulsion etc. or a combination of two or more thereof. The person skilled in the art will know which method(s) to apply for producing the respective product.

In general, the product comprising or even consisting of the copolymer or the polymer blend according to the present invention may be any product producible therewith.

As indicated above, in the context of the present invention, it is of particular interest to obtain a translucent or at least partly translucent copolymer and/or polymer blend comprising said copolymer. Therefore, also the product is preferably a translucent or at least partly translucent or contains translucent or at least partly translucent parts.

Particularly, a product in the sense of the present invention is such, where it is particularly desired to enable light transmittance in the near UV spectrum. Such product may, exemplarily, be a product related to plant growth (e.g., a greenhouse, a stadium, a window pane), may be a solar cell or may be a laboratory measuring device (e.g., a cuvette). Such product may also be such, where the visual appearance of a commercially valuable product such as a food or consumer product, a beverage or cloths may be impaired when UV light has to pass its packing material because visible brightening fluorescence effects in the blue spectrum of the visible light (e.g., resulting from one or more brightener agent(s) in said commercially valuable product) are desired.

Accordingly, in a preferred embodiment of the present invention, the product has a light transmission of at least 50%, preferably of at least 60%, more preferably of at least 70%, even more preferably of at least 80%, in particular of at least 85% of ultraviolet (UV) light at a wavelength range of between 250 nm and 370 nm.

In another preferred embodiment of the present invention, the product also has a light transmission of at least 50%, preferably of at least 60%, more preferably of at least 70%, even more preferably of at least 80%, in particular of at least 85% of ultraviolet (UV) light at a wavelength range of between 200 nm and 400 nm, in particular of between 200 nm and 370 nm.

These results are preferably obtained in a measurement of transmission through a layer of a thickness of ⅛ inch (approximately 3.2 mm).

Accordingly, more preferably, the product has a light transmission of at least 50%, even more preferably of at least 60%, even more preferably of at least 70%, even more preferably of at least 80%, in particular of at least 85% of ultraviolet (UV) light at a wavelength range from 250 nm to 800 nm, measured as transmission through a layer of a thickness of ⅛ inch (approximately 3.2 mm).

As indicated above, the product comprising or even consisting of the copolymer or the polymer blend according to the present invention may be any product producible therewith.

In a preferred embodiment, the product is selected from the group consisting of thermoplastic molding, film material, packing material, fiber, yarn, fabric, tissue, foam and composite material, in particular wherein said product is a thermoplastics molding or a film material.

The term "plastics molding" as used herein may be understood in the broadest sense as producing any shaped piece. Exemplarily, a plastics molding may be produced by extrusion, injection molding or rolling.

The term "film material" as used herein may be understood in the broadest sense as any thin and flexible material. Preferably, the film material has a thickness of less than 5 mm, preferably of less than 2 mm, even more preferably of less than 1 mm, in particular of not more than 0.5 mm. Preferably, but not necessarily, the film material is pellucid. The film material may be used for any purpose such as, exemplarily, for packing goods (e.g., foods, beverages, food or beverage containers, consumer goods, books, clothes, electrics etc.) or may be used as plastic bags, slides, stickers, blister packing etc. Exemplarily, a film material may be produced by blow molding or rolling.

As used herein, the term "packing material" may be understood in the broadest sense as any product for packing. Packing material may be a film material or may be a less flexible material of a higher thickness such as, e.g., a food or beverage container, a blister packing, tableware etc. Exemplarily, a packing material may be produced by blow molding, extrusion, injection molding or rolling.

Exemplarily, a fiber or yarn may be produced in a way including spinning, rolling, weaving and may, then, optionally, be subjected to weaving forming a fabric or tissue.

A composite may be any composite in the art. Preferably, a composite may further comprise one or more layers of a metal or alloy, one or more layers of other plastic material(s) and/or one or more layer(s) of cardboard. Preferably, a composite may further comprise one or more metal or alloy film(s), one or more films of other plastic material(s) or a thin cardboard of not more than 1.5 mm in thickness. Then, exemplarily, a liquid packaging board may be produced.

Micro- or nanobeads may exemplarily be formed generating a suspension from an emulsion or by spraying. Micro- or nanobeads and/or an implant may also comprise one or more pharmaceutically active agent(s) including drugs, growth factors etc.

Micro- or nanobeads and/or an implant may be coated by another pharmaceutically acceptable polymer.

Exemplarily, the product according to the present invention may be used in the fields of optical waveguides, transparent parts for automotive, household, computer and communication devices, for applications in toys, sports equipment, medical (dripping chamber, medical device housing), trays, for application in packaging and building & construction (panels, window frames and windows).

Preferably, the copolymer or polymer blend according to the present invention constitutes for more than 50% (w/w), more preferably for more than 60% (w/w), even more preferably for more than 70% (w/w), even more preferably for more than 80% (w/w), even more preferably for more than 90% (w/w) of the product or a functional part thereof, in particular wherein the product a functional part thereof essentially consists of a polymer blend according to the present invention.

As used herein, a functional part may be, exemplarily, a window pane, a signboard, a film, a lamb case, a key, a screen, or a surface coating of one of the aforementioned or a product or part thereof.

The wide usability of products according to the present invention may be exemplified as translucent packing materials (e.g., translucent films (e.g., for food packing) or plastics moldings (e.g., bottles, boxes, etc.)), translucent parts of buildings (e.g., window panes, films, signboards, roofs etc.), translucent parts of cars (e.g., panes, lamb cases, keys, screens etc.), translucent parts of electronics (e.g., screen surfaces, cases, lambs, keys, etc.), an optic fiber (light pipe), a solar panel, or translucent parts of varnish, toys, sports equipment or medical and laboratory equipment).

In a still further aspect, the present invention therefore relates to the use of a copolymer, a polymer blend or a product according to the present invention for producing a final product or a component part thereof, enabling light transmittance, in particular light transmittance in the visible spectrum and in the ultraviolet spectrum from 250 nm to 800 nm. Therefore, the copolymer, the polymer blend or a product according to the present invention is widely transparent concomitantly in both, the visible spectrum (i.e., in the range of between 400 and 800 nm) as well as in the ultraviolet spectrum (i.e., in the range of or below 400 nm, preferably in the range of from 200 to 400 nm, more preferably in the range of from 200 to 370 nm or from 250 to 400 nm, in particular in the range of from 250 to 370 nm).

Preferred embodiments are those mentioned above, in the context of the copolymer, the polymer blend and/or the final product as laid out above.

Accordingly, the present invention also relates to the use of a copolymer, a polymer blend or a product according to the present invention for producing a final product or a component part thereof, enabling light transmittance in the ultraviolet spectrum from 250 nm to 370 nm.

In the view of the above, the present invention also relates to the use of a copolymer, a polymer blend or a product according to the present invention for producing a final product having a light transmittance (measured at a thickness of 3.2 mm) of at least 50%, preferably of at least 60%, more preferably of at least 70%, even more preferably of at least 80%, in particular of at least 85% of ultraviolet (UV) light at a wavelength range of between 250 nm and 370 nm.

Highly preferably, the present invention also relates to the use of a copolymer consisting of
(A) 40-50% (w/w) of methyl methacrylate (MMA); and
(B) 50-60% (w/w) of one or more vinylaromatic(s),
for producing a final product having a light transmittance (measured at a thickness of 3.2 mm) of at least 80%, in particular of at least 85% of ultraviolet (UV) light at a wavelength range of between 250 nm and 370 nm.

Particularly preferably, the present invention also relates to the use of a random copolymer consisting of
(A) 45-50% (w/w) of methyl methacrylate (MMA); and
(B) 50-55% (w/w) of one or more vinylaromatic(s).
for producing a final product having a light transmittance (measured at a thickness of 3.2 mm) of at least 85% of ultraviolet (UV) light at a wavelength range of between 250 nm and 370 nm.

Consequently, in other words, the present invention therefore relates to a method for producing a final product or a component part thereof, enabling light transmittance, in particular light transmittance in the visible spectrum and in the ultraviolet spectrum from 250 nm to 800 nm melting a copolymer or a polymer blend according to the present invention and forming the final product thereof.

Preferred embodiments are those mentioned above, in the context of the use, the copolymer, the polymer blend and/or the final product as laid out above.

As used herein, the term "final product" may be understood in the broadest sense as any complex product that is composed of several component parts. Exemplarily, a car, a house, an electronic device is such final product in the context of the present invention.

A component part may be any construction element that is comprised in or connected with final product. Exemplarily, a component part may be a plastics molding or film suitable to be integrated into, e.g., a food packing, window or screen panes suitable to be integrated into a car, a house, an electronic device or a toy, keys and/or lambs suitable to be integrated into a car, a house, an electronic device, a tubing or case suitable to be integrated into a car, a house, an electronic device or medicinal equipment.

The person skilled in the art will also notice that a product in the sense of the present invention may also be a molding mass comprising at least one copolymer or at least one polymer blend according to the present invention, wherein said molding mass may either be a melt or present as a raw material for molding processes (e.g., in the form of pellets, powder and/or blocks) or may be at least one copolymer or at least one polymer blend according to the present invention dissolved in a suitable solvent.

In general, a copolymers according to the present invention may be obtained by any means suitable therefore known in the art. The person skilled in the art knows numerous methods suitable for obtaining such copolymer. Well-known conventional polymerization procedures may be employed in the preparation of such copolymer according to the present invention.

Exemplarily, the copolymers may be prepared by emulsion polymerization, solution polymerization or bulk polymerization. Preferably, heat or radical initiation may be used (including living polymerization methods).

Exemplarily, the copolymers may be prepared by heating a homogeneous mixture containing appropriate proportions of the monomers (i.e., (a) one or more type(s) of methyl methacrylate (MMA) monomers and (b) one or more type(s) vinylaromatic monomers and optionally (c) one or more type(s) aliphatic vinyl monomers and/or (d) further component(s) and/or additive(s)) and maintaining the mixture until copolymerization is accomplished to the desired degree.

When such method is used, the copolymerization may be initiated at a relatively low temperature (e.g., approximately 100° C.) and then the temperature may be increased in order to complete the copolymerization. Such method may also be conducted in the absence of a polymerization initiator. Alternatively or additionally, the copolymerization may also be initiated by means of a polymerization initiator.

In a yet further aspect, the present invention relates to a method for producing a copolymer according to the present invention, wherein said method comprises the following steps:
(i) providing a reaction mixture comprising:
   (a) one or more type(s) of methyl methacrylate (MMA) monomers,
   (b) one or more type(s) vinylaromatic monomers, and optionally
   (c) one or more type(s) aliphatic vinyl monomers,
   in a ratio of (a):(b):(c) resulting in a copolymer having the properties as indicated above;
(ii) initiating the polymerization (a), (b) and optionally (c) in the reaction mixture of step (i);
(iii) enabling the copolymerization of (a), (b) and optionally (c) in said reaction mixture wherein the polymerization is initiated according to step (ii); and
(iv) withdrawing the copolymer from the reaction mixture wherein (a), (b) and optionally (c) have been copolymerized according to step (iii).

It will be understood that the copolymer obtainable from said method preferably bears the characteristics as laid out above and may be used for the purpose as laid out above. Preferably, in the view of above, said method is for preparing a product or part thereof being translucent for light in the visible spectrum and, concomitantly, in the ultraviolet spectrum from 250 nm to 800 nm. In particular, said method is for preparing a product or part thereof being translucent having a light transmittance (measured at a thickness of 3.2 mm) of at least 50%, preferably of at least 60%, more preferably of at least 70%, even more preferably of at least 80%, in particular of at least 85% of ultraviolet (UV) light at a wavelength range of between 250 nm and 370 nm.

Methyl methacrylate (MMA) monomers (a) as well as numerous vinylaromatic and aliphatic vinyl monomers are commercially available. Others can be easily obtained by standard chemical processes. As indicated above, a vinyl monomer is characterized by its vinyl group ($-CH=CH_2$) in its monomeric form.

Therefore, vinyl monomers may also be obtained from precursor molecules. Exemplarily, precursor molecules bearing an ethyl residue ($-CH_2-CH_3$) may be oxidized/dehydrated, halogenated precursor molecules bearing a halogenethyl residue (e.g., $-CHCl-CH_3$, $-CH_2-CH_2Cl$) may be dehalogenated by eliminating the respective acid (e.g., HCl) or hydroxylated precursor molecules bearing a hydroxyethyl residue (e.g., $-CHOH-CH_3$, $-CH_2-CH_2OH$) may be dehydrogenated by eliminating water (e.g., $H_2O$). Then, the respective vinyl monomers are obtainable.

The mixture of monomers of step (i) may optionally include further compounds such as, e.g., one or more solvent(s), one or more initiator(s) (e.g., one or more radical starter(s)) and/or one or more polymer additives (see above).

Exemplarily, initiation according to step (ii) may be started by thermal decomposition of an initiator (e.g an organic peroxide (e.g., dicumyl peroxide) or an azo compound), photolysis (e.g., with metal iodides, metal alkyls or azo compounds (e.g., azoisobutylnitrile (AIBN))), a peroxide initiator (e.g., benzoyl peroxide), an initiator composition enabling a redox reaction (e.g., reduction of hydrogen peroxide or an alkyl hydrogen peroxide by means of iron ions or other reductants such as, e.g, $Cr^{2+}$, $V^{2+}$, $Ti^{3+}$, $Co^{2+}$ or $Cu^+$), persulfate activation, ionizing radiation (e.g., by means of $\alpha$-, $\beta$-, $\gamma$- or x-rays), electrochemical activation, plasma activation, sonication (e.g., at around 16 kHz) or a ternary Initiator (e.g., benzoyl peroxide-3,6-bis(o-carboxybenzoyl)-N-isopropylcarbazole-di-η5-indenylzicronium dichloride optionally in combination with a metallocene (e.g., indenyl-zirconium) and/or a peroxide (e.g., benzoyl peroxide).

In a preferred embodiment, step (ii) comprises heating of the reaction mixture obtained from step (i) above a temperature above 100° C. and/or adding one or more polymerization initiator(s) to said reaction mixture.

Enabling the copolymerization according to step (iii) means, that the reaction mixture obtained from step (ii) in maintained or brought to conditions allowing chain elongation of the polymer. For instance, the temperature is set according to the monomer/copolymer content of the reaction mixture. Exemplarily, as indicated above, the temperature may optionally also be varied during incubation, such as, e.g., constantly or stepwise increased during the polymerization process.

The step of withdrawing the copolymer from the reaction mixture (step (iv)) may be of particular importance when the reaction mixture contains further compounds such as solvent(s) or when an excess of residual monomers, short-length multi- and polymers (e.g., dimers, trimers, etc.), initiators, polymer additives and/or impurities should be removed from the copolymer. Exemplarily, the polymer may be withdrawn from the reaction mixture by means of taking macroscopic parts thereof from the mixture or by means of sieving. Alternatively or additionally, the comparably volatile compounds such as solvent(s), residual monomers, short-length multi- and polymers, initiators, polymer additives and/or impurities may be removed by evaporation and/or washing the copolymer with one or mole solvent(s).

Exemplarily, methods for producing a copolymer according to the present invention may be conducted as shown in any of GB 464688, GB 531956, GB 863279 and WO 2003/051973.

After the copolymer has been produced, either by the method according to the present invention or by any other means, it may optionally be processed further. Exemplarily, it may be directly used for the production of a product such as, e.g., a final product and/or a component part. Alternatively, the copolymer may also be blended with other components. These blends may then optionally be processed further to a product such as, e.g., a final product and/or a component part. The person skilled in the art will, however, notice that in many circumstances, it may also be beneficial to first produce a raw material comprising the copolymer or the blend in a form that is particularly well processible such as, e.g., pellets, powder or a solution in a solvent comprising said copolymer or said blend.

As indicated above, the copolymer according to the present invention bears, concomitantly, good translucency and processibility. Furthermore, good mechanical properties can be achieved.

Therefore, such copolymer is particularly desirable in a variety of technical applications.

The invention is further explained by the following examples and the patent claims.

EXAMPLES

1. Preparation of the MMA-Styrene Copolymers

A continuous feed of at least one vinyl aromatic monomer (i.e. styrene) and methyl methacrylate (i.e. MMA) are added to a single or to a series of stirred tank reactors.

A free radical initiator, for example a hydroperoxide (i.e. cumyl-hydroperoxide), peroxydicarbonate, peroxyester, peroxyketal, or dialkyl peroxide, may be added to supplement thermal initiation.

Diluents such as ethylbenzene, toluene, or xylenes (i.e. ethylbenzene) may be added to reduce viscosity, and chain transfer agents, such as tert-dodecylmercaptan (i.e. normal dodecylmercaptan), α-methylstyrene dimer, may be added for molecular weight control. Ultimate reaction conversion is preferably in the range of 60 to 85%.

The copolymer product stream leaving the final polymerization reactor is sent to a preheater, then to a devolatizer to remove volatile components from the molten polymer. The devolatizer operates at temperatures of from 200 to 245° C. and a pressure less than 20 mbar.

The molten devolatilized polymer is then pumped through a die-plate with roughly 3 mm holes, cooled to less than 40° C., then cut into pellets roughly 3 mm long. Molding compositions of several copolymers of styrene and MMA were prepared accordingly.

2. Testing of the MMA-Styrene Copolymer Products

As can be seen from Table 1, only those copolymers of styrene and MMA with an MMA content of between 20 and 50% (w/w) show a suitable processibility (molding stability at 280° C.) and, concomitantly, a suitable light transmittance (at 250-370 nm).

TABLE 1

Improved transparency and light transmittance at S/MMA copolymers at a weight-ratio of 80/20-50/50

| | S/MMA | | | | | |
| --- | --- | --- | --- | --- | --- | --- |
| | 100/0 | 80/20 | 50/50 | 40/60 | 0/100 | Comment |
| Molding stability* | 1 | 1 | 1-2 | 2 | 3 | Target: max 1-2 |
| Light transmittance at 250-370 nm, 3.2 mm** | 3 | 2-3 | 2 | 1-2 | 1 | Target: max 2-3 |

*Generation of volatiles in a closed chamber at 280° C. after 15 min: 1 = no visible deposits, 2 = visible deposits, 3 = strong deposits.
**Light transmittance 250-370 nm (at a layer thickness of 3.2 mm): 1: >90%, 2: >85%, 3: >70%

As can be seen from the following Table 2, the copolymers of styrene and MMA with an MMA content of between 20 and 60% (w/w) show a good Melt Flow Rate (see e.g. DIN EN ISO 1133) and good mechanical properties, such as tensile stress at break (see e.g. DIN EN ISO 527).

| | S/MMA | | | | |
| --- | --- | --- | --- | --- | --- |
| | 100/0 | 80/20 | 50/50 | 40/60 | 0/100 |
| Melt Flow Rate, g/10 minutes | 3$^a$ | 1.9$^a$ | 1.6$^a$ | 1.6$^a$ | 3$^b$ |
| Tensile Stress at Break, Mpa | 49 | 58 | 66 | 69 | 76 |

$^a$at 200° C. and 5 kg
$^b$at 230° C. and 3.8 kg

The invention claimed is:

1. A copolymer consisting of the following monomers:
   (A) 30-45% (w/w) of methyl methacrylate (MMA);
   (B) 55-70% (w/w) of one or more vinylaromatic(s); and optionally
   (C) 0-1% (w/w) of one or more aliphatic vinyl(s),
   wherein said copolymer is a random copolymer and has a melt flow index determined at a temperature of 200° C. and at a load of 5 kg according to ASTM procedure D1238 of less than 20 g/10 min and comprises at least 500 consecutive monomer moieties.

2. The copolymer according to claim 1, wherein the one or more vinylaromatic(s) (B) comprise(s) styrene, one or more styrene derivative(s) or a mixture thereof.

3. The copolymer according to claim 1, wherein the one or more vinylaromatic(s) (B) comprise(s) at least 50% (w/w) styrene.

4. The copolymer according to claim 1, which is a random copolymer, consisting of:
   (A) 30-45% (w/w) of methyl methacrylate (MMA); and
   (B) 55-70% (w/w) of one or more vinylaromatic(s).

5. A polymer composition comprising a copolymer according to claim 1 and at least one further thermoplastic polymer component.

6. The polymer composition according to claim 5, further comprising one or more thermoplastic polymer(s) selected from the group consisting of:
   polystyrene, poly(meth)acrylate, polycarbonate, styrene acrylonitrile copolymer (SAN), acrylonitrile butadiene styrene copolymer (ABS), acrylonitrile styrene acrylate copolymer (ASA), polylactic acid (PLA), polyester, polyoxymethylene, polyethylene, polypropylene, polyvinylchloride (PVC) and polyamide.

7. The copolymer according to claim 1, wherein said copolymer is comprised in a product, wherein said product has a light transmission of at least 50% of ultraviolet (UV) light at a wavelength range of between 250 nm and 370 nm.

8. The copolymer according to claim 1, wherein said copolymer is comprised in a product, wherein said product has a light transmission of at least 60% of ultraviolet (UV) light at a wavelength range of between 250 nm and 370 nm.

9. The copolymer according to claim 1, wherein said copolymer is comprised in a product, wherein said product has a light transmission of at least 70% of ultraviolet (UV) light at a wavelength range of between 250 nm and 370 nm.

10. The copolymer according to claim 1, wherein said copolymer is comprised in a product, wherein said product has a light transmission of at least 80% of ultraviolet (UV) light at a wavelength range of between 250 nm and 370 nm.

11. The copolymer according to claim 1, wherein said copolymer is comprised in a product, wherein said product has a light transmission of at least 85% of ultraviolet (UV) light at a wavelength range of between 250 nm and 370 nm.

12. The copolymer according to claim 1, wherein said copolymer is comprised in a product selected from the group consisting of thermoplastic molding, film material, packing material, fiber, yarn, fabric, tissue, foam and composite material.

13. The copolymer according to claim 1, wherein the one or more vinylaromatic(s) (B) comprise(s) at least 70% (w/w) styrene.

14. The copolymer according to claim 1, wherein the one or more vinylaromatic(s) (B) wherein the only vinylaromatic (B) in said copolymer is styrene.

15. The copolymer according to claim 1, said copolymer enabling light transmittance in the visible spectrum and in the ultraviolet spectrum of between 250 nm and 800 nm.

16. A method for producing a copolymer according to claim 1, wherein said method comprises the following steps:
   (i) providing a reaction mixture comprising:
      (a) one or more type(s) of methyl methacrylate (MMA) monomers,
      (b) one or more type(s) vinylaromatic monomers, and optionally
      (c) one or more type(s) aliphatic vinyl monomers, in a ratio of (a):(b):(c) resulting in a copolymer according to claim 1;
   (ii) initiating the polymerization (a), (b) and optionally (c) in the reaction mixture of step (i);
   (iii) enabling the copolymerization of (a), (b) and optionally (c) in said reaction mixture wherein the polymerization is initiated according to step (ii); and
   (iv) withdrawing the copolymer from the reaction mixture wherein (a), (b) and optionally (c) have been copolymerized according to step (iii).

17. The method of claim 16, wherein step (ii) comprises heating of the reaction mixture obtained from step (i) above a temperature above 100° C. or adding one or more polymerization initiator(s) to said reaction mixture.

18. The method of claim 16, wherein step (ii) comprises heating of the reaction mixture obtained from step (i) above a temperature above 100° C. and adding one or more polymerization initiator(s) to said reaction mixture.

* * * * *